United States Patent
Gummalla et al.

(10) Patent No.: US 11,941,029 B2
(45) Date of Patent: Mar. 26, 2024

(54) AUTOMATIC EXTENSION OF DATABASE PARTITIONS

(71) Applicant: Bank of America Corporation, Charlotte, NC (US)

(72) Inventors: Pradeep Gummalla, Secunderabad (IN); Krishna Mohan Sattiraju, Hyderabad (IN); Paparayudu Anaparti, Hyderabad (IN); Maniappan Uppliappan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 169 days.

(21) Appl. No.: 17/649,903

(22) Filed: Feb. 3, 2022

(65) Prior Publication Data
US 2023/0244696 A1    Aug. 3, 2023

(51) Int. Cl.
 G06F 16/27    (2019.01)
 G06F 16/22    (2019.01)

(52) U.S. Cl.
 CPC ........ G06F 16/278 (2019.01); G06F 16/2282 (2019.01)

(58) Field of Classification Search
 CPC .................................................. G06F 16/278
 USPC ......................................................... 707/802
 See application file for complete search history.

(56) References Cited

U.S. PATENT DOCUMENTS

| | | |
|---|---|---|
| 6,598,058 B2 | 7/2003 | Bird et al. |
| 6,633,882 B1 | 10/2003 | Fayyad et al. |
| 7,359,913 B1 | 4/2008 | Ordonez |
| 7,398,264 B2 | 7/2008 | Krishnamoorthy |
| 7,814,045 B2 | 10/2010 | Hermann et al. |
| 7,844,633 B2 | 11/2010 | Miszczyk et al. |
| 8,386,540 B1 | 2/2013 | Mcalister et al. |
| 8,812,564 B2 | 8/2014 | Peh et al. |
| 8,983,919 B2 | 3/2015 | Gislason |
| 9,135,298 B2 | 9/2015 | Day et al. |
| 9,183,234 B2 | 11/2015 | Mueller |
| 9,460,185 B2 | 10/2016 | Swift et al. |
| 9,495,398 B2 | 11/2016 | Parkkinen et al. |
| 9,558,207 B1 | 1/2017 | Mcalister et al. |
| 9,607,042 B2 | 3/2017 | Long |
| 9,794,135 B2 | 10/2017 | Theimer et al. |
| 9,977,796 B2 | 5/2018 | Fricke et al. |
| 10,019,284 B2 | 7/2018 | Promhouse et al. |
| 10,031,935 B1 | 7/2018 | Cole et al. |

(Continued)

FOREIGN PATENT DOCUMENTS

| | | |
|---|---|---|
| AU | 2014346366 A1 | 6/2016 |
| CA | 2930026 C | 6/2020 |

(Continued)

*Primary Examiner* — Muluemebet Gurmu

(57) ABSTRACT

A system includes a database that stores a database table and at least one processor configured to detect a trigger event that triggers extending of a current data partitioning definition defined for partitioning data stored in the database table, obtain a partition configuration to extend the current data partitioning definition, obtain the current data partitioning definition of the database table, generate a new data partitioning definition for the database table based on the current data partitioning definition and the partition configuration, and perform data partitioning for the database table based on the new data partitioning definition.

20 Claims, 3 Drawing Sheets

(56) References Cited

U.S. PATENT DOCUMENTS

| | | | |
|---|---|---|---|
| 10,061,831 B2 | 8/2018 | Milousheff et al. |
| 10,346,383 B2 | 7/2019 | Yoon et al. |
| 10,346,434 B1 | 7/2019 | Morkel et al. |
| 10,467,105 B2 | 11/2019 | Theimer et al. |
| 10,664,497 B2 | 5/2020 | Yoon et al. |
| 10,691,716 B2 | 6/2020 | Theimer et al. |
| 10,747,773 B2 | 8/2020 | Yoshida et al. |
| 10,817,540 B2 | 10/2020 | Cruanes et al. |
| 10,824,624 B2 | 11/2020 | Kathirvel et al. |
| 10,838,981 B2 | 11/2020 | Keller |
| 10,983,970 B2 | 4/2021 | Hu et al. |
| 11,030,184 B2 | 6/2021 | Konkimalla et al. |
| 11,176,132 B2 | 11/2021 | Jeong et al. |
| 11,204,900 B2 | 12/2021 | Hu et al. |
| 2004/0015486 A1 | 1/2004 | Liang et al. |
| 2011/0099503 A1* | 4/2011 | Golani .............. G06F 16/254 709/221 |
| 2012/0158650 A1 | 6/2012 | Scott et al. |
| 2013/0159659 A1 | 6/2013 | Gelman et al. |
| 2016/0179920 A1* | 6/2016 | Milousheff .......... G06F 16/213 707/626 |
| 2016/0232208 A1 | 8/2016 | Duan et al. |
| 2016/0371355 A1 | 12/2016 | Massari et al. |
| 2017/0083573 A1 | 3/2017 | Rogers et al. |
| 2018/0004777 A1 | 1/2018 | Bulkowski et al. |
| 2018/0357264 A1* | 12/2018 | Rice .................. G06F 16/2282 |
| 2019/0220450 A1* | 7/2019 | Hu .................... G06F 16/213 |
| 2020/0301941 A1 | 9/2020 | Wilson et al. |
| 2021/0173746 A1 | 6/2021 | Shaull |

FOREIGN PATENT DOCUMENTS

| | | |
|---|---|---|
| CN | 102609488 A | 7/2012 |
| CN | 108228817 B | 12/2021 |
| EP | 3889794 A1 | 10/2021 |
| JP | 5283675 B2 | 9/2013 |
| JP | 5674850 B2 | 2/2015 |
| JP | 2015026396 A | 2/2015 |
| WO | 2014093262 A1 | 6/2014 |
| WO | 2017019889 A1 | 2/2017 |
| WO | 2017062288 A1 | 4/2017 |
| WO | 2018157145 A1 | 8/2018 |

* cited by examiner

AUTOMATIC EXTENSION OF DATABASE PARTITIONS

TECHNICAL FIELD

The present disclosure relates generally to data processing, and more specifically to automatic extension of database partitions.

BACKGROUND

Partitioning is a database process where very large database tables are divided into multiple smaller parts. By splitting a large table into smaller, individual tables, queries that access only a fraction of the data can run faster because there is less data to scan. The main of goal of partitioning is to aid in maintenance of large tables and to reduce the overall response time to read and load data for particular operations. Partitioning definitions for database tables need to be updated or extended from time to time so that newly added data not covered by the current partitioning definitions is assigned an appropriate data partition. If a current partitioning definition of a database table is not timely extended, data may fall out of range affecting query performance of the database table.

SUMMARY

The system and methods implemented by the system as disclosed in the present disclosure provide a technique for extending database partitioning timely, intelligently and automatically. The disclosed system and methods provide several practical applications and technical advantages.

For example, the disclosed system and methods provide the practical application of automatically extending a current data partitioning definition of a database table based on pre-defined partition configuration. A database manager automatically extends a current data partitioning definition defined for a database table based on the partitioning configuration. Partition configuration includes configuration defining how to extend a current data partitioning as defined for a database table by the current data partitioning definition. Database manager generates a new partitioning definition for the database table based on the partitioning configuration defined for the database table. The database manager replaces the current partitioning definition with the new partitioning definition, thus extending or updating the current partitioning definition of the database table. Once replaced, the new partitioning definition becomes the current partitioning definition for the database table and data contained in the database table is partitioned based on the updated current partitioning definition. By automatically and timely extending data partitioning for database tables of a database, the disclosed system and methods help ensure that most data records in the database are assigned appropriate data partitions, thus avoiding unpartitioned data to exist in the database tables. This helps maintain query performance of the database at the highest levels and avoids data processing errors and failures related to processing data extracted from the database. Thus, the disclosed system and methods improve the technology related to data partitioning in database systems.

The disclosed system and methods provide an additional technical advantage of improving performance of a computing system configured to manage a database management system. As described in embodiments of the present disclosure, the disclosed system and methods timely and automatically extend or update data partitioning for a database, thus avoiding unpartitioned data to exist in the database. By avoiding unpartitioned data to exist in the database, the disclosed system and methods significantly improve the efficiency of processing database queries, which in turn improves the overall processing performance of the computing system running the database management system.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
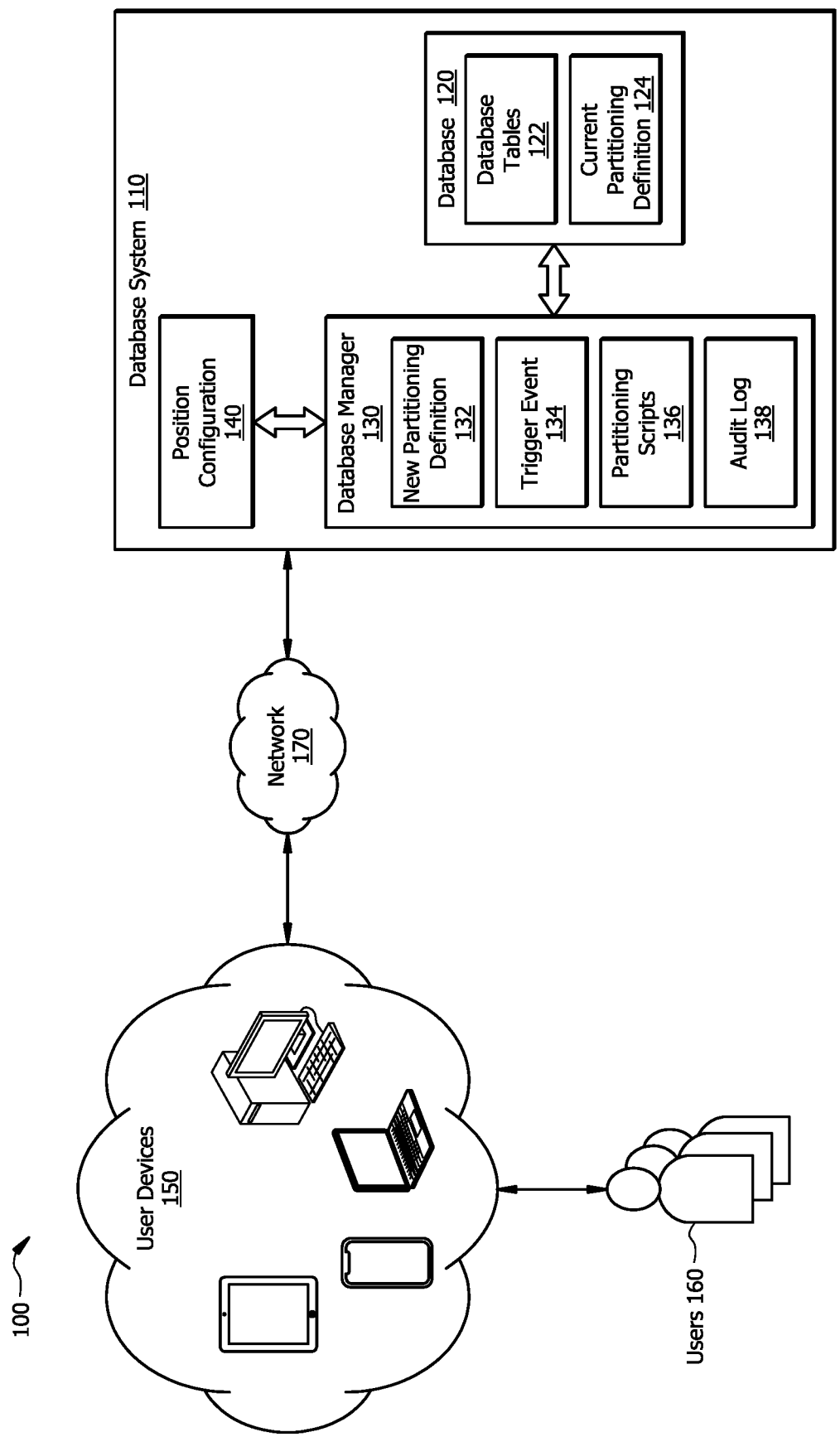
FIG. 1 is a schematic diagram of an example data processing system, in accordance with one or more embodiments of the present disclosure.

FIG. 1 is a schematic diagram of an example data processing system 100, in accordance with one or more embodiments of the present disclosure.

As shown in FIG. 1, data processing system 100 may include a database system 110 and one or more user devices 150, each connected to a network 170. The network 170, in general, may be a wide area network (WAN), a personal area network (PAN), a cellular network, or any other technology that allows devices to communicate electronically with other devices. In one or more embodiments, the network 170 may be the Internet. Each user device 150 may be operated by one or more users 160. Each user device 150 may be a computing device that can be operated by a user 160 and communicate with other devices connected to the network 170.

In one or more embodiments, each of the database system 110 and user devices 150 may be implemented by a computing device running one or more software applications. For example, one or more of the database system 110 and user devices 150 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the database system 110 and user devices 150 may be representative of a server running one or more software applications to implement respective functionality as described below. In certain embodiments, one or more of the database system 110 and user devices 150 may run a thin client software application where the processing is directed by the thin client but largely performed by a central entity such as a server (not shown).

In one embodiment, the database system 110 may be a standalone computing device (e.g., desktop computer, laptop computer, mobile computing device etc.) directly connected to or including a display device (e.g., a desktop monitor, laptop screen, smartphone screen etc.) and a user interface device (e.g., keyboard, computer mouse, touchpad etc.) allowing a user 160 to interact with the computing device.

Database system 110 includes database 120, database manager 130, and partition configuration 140. Database 120 may store one or more database tables 122 along with current data partitioning definitions 124 for one or more of the database tables 122. Each database table 122 is a database object that contains at least a portion of data stored in the database 120. In each database table 122, data may be logically organized in a row-and-column format similar to a spreadsheet. Each row represents a unique data record, and each column represents a field in the record. For example, a database table 122 that contains employee data for a company may contain a row for each employee and columns representing employee information such as employee number, name, joining date, address, job title, and home telephone number. Each column of a database table may be referred to as a data type as each column includes a type of data relating to each data record or row. It may be noted that the terms "data type" and "column" are interchangeably used throughout the present disclosure. Database 120 may be queried using database queries (e.g., SQL query) to extract desired data stored in the database tables 122. A user 160 may use a user device 150 to define one or more query parameters of a database query. Query parameters are generally search parameters based on which the database 120 is to be searched for desired data. For example, a user interface provided on the user device 150 may allow the user 160 to enter or select one or more query parameters. A database query may be built (e.g., by a software application provided at the user device) based on the query parameters. The database query may be transmitted to the database system (e.g., over the network 170). The database system 110 may search the database 120 (e.g., database tables 122) based on the database query, extract data from one or more database tables 122 based on the query parameters of the database query and transmit back the extracted data to the user device 150.

To improve performance (e.g., query performance) of the database 120, data stored in one or more database tables 122 may be divided into smaller parts. This database process may be referred to as database table partitioning, database partitioning or data partitioning. Each of the smaller data parts may be referred to as a data partition. In one embodiment, each data partition is a database table 122 that stores a portion of the data divided out of a larger database table 122. By splitting a large database table 122 into smaller, individual database tables 122, queries that access only a fraction of the data can run faster because there is less data to scan. A current partitioning definition 124 of a database table 122 defines how data in the database table 122 is to be partitioned.

A database table 122 may be partitioned in accordance with one or more of several data partitioning techniques or types. For example, range-based partitioning may be used to assign data partitions to data stored in a database table 122. Range partitioning divides the information into a number of partitions depending on the ranges of values of particular partitioning keys for every partition of data. The partitioning keys may include the data types (represented by column headings) stored by the database table 122. For example, a database table 122 that contains employee data for a company may contain a row for each employee and columns representing employee information such as employee number, name, joining date, address, job title, and home telephone number. The current partitioning definition 124 of the employee database table 122 may define partitioning of the employee data based on the data type "employee joining month". The current partitioning definition 124 may define several ranges of employee joining month, wherein each defined range of employee joining month corresponds to a different data partition. For example, the ranges may include January 1-January 31, February 1-February 28, March 1-March 31 and so on. A data partition for an employee data record (e.g., row of the database table 122) is selected by determining if the employee joining date associated with the record is within a certain defined month range. Thus, a separate database partition or database table 122 may exist for employee joining dates corresponding to each month of the year. Case partitioning assigns data partitions based on a defined logical condition. A current partitioning definition 124 for a database table 122 may define case partitioning including a logical condition based on one or more data types. For example, referring to the example employee database table 122 discussed above, a current partitioning definition 124 may define that a different partition is to be assigned for employee data records based on a combination of employee joining year and employee location. For example, employee data records with joining year "2020" and location "USA" are assigned a first data partition and employee data records with joining year "2020" and location "Japan" are assigned a second different data partition.

Data partitioning for a database table 122 may include single-level data partitioning and multi-level data partitioning. A single-level data partitioning generally partitions data based on a single data type of a database table 122. On the other hand, multi-level data partitioning partitions data based on a combination of multiple (e.g., two or more) data types of a database table 122. For example, referring to the example employee database table 122 discussed above, a single-level range-based partitioning may include a partitioning definition 124 that partitions employee data in the database table 122 based on employee joining month only. A multi-level data partitioning may include a partitioning definition 124 that partitions employee data based on a combination of employee joining month and employee joining year. For example, a different data partitioning may be assigned to data records for different combinations of employee joining months and employee joining years. A single-level case-based partitioning may include a partitioning definition 124 defining a logical condition that partitions employee data based on employee location only. For example, different data partitions are assigned to data records with employee location set to "USA" and "Asia". A multi-level case-based partition may include a partitioning definition 124 defining a logical condition based on a combination of employee joining month and employee location. For example, employee data records with joining year "2020" and location "USA" are assigned a first data partition and employee data records with joining year "2020" and location "Japan" are assigned a second different data partition.

Current data partitioning definitions 124 defined for database tables 122 of the database 120 may need to be extended from time to time, for example, to partition data not covered by the current data partitioning definitions 124 and/or based on changing organizational needs. For example, a current data partitioning definition 124 for an employee database table 122 may define range-based data partitioning based on employee joining year till 2021. The current partitioning definition 124 may not define data partitions for data records associated with employee joining dates beyond 2021. Thus, data records having employee joining dates beyond 2021 are out of range and remain unpartitioned. In another example, a current partitioning definition 124 for the employee database table 122 may define a logical condition (e.g., case-based partitioning) that partitions employee data based on employee location only. For example, different data partitions are assigned to data records with employee location set to "USA", "Asia" and Europe. However, the company may open a new location in Australia and may start hiring new employees in Australia. In this case, all data records relating to employees at the new location are not covered by the current partitioning definition 124, and thus, remain unpartitioned. Unpartitioned data may adversely affect performance of the database 120, for example, by reducing query performance for the database tables 122 including unpartitioned data. Accordingly, the database 120 needs to be monitored and the current partitioning definitions 124 need to be updated from time to time based on changing organizational needs.

Aspects of the present disclosure discuss a system (e.g., data processing system 100) and techniques to extend data partitioning for database tables 122 intelligently and automatically. Database manager 130 may be configured to perform one or more operations associated with the database 120 including operations associated with automatically extending current data partitioning definitions defined for database tables 122. As described in more detail below, database manager 130 may be configured to automatically extend a current data partitioning definition 124 defined for a database table 122 based on partitioning configuration 140. Partition configuration 140 may include configuration defining when and/or how to extend a current data partitioning defined for a database table 122 by a current data partitioning definition 124. Database manager 130 may be configured to generate a new partitioning definition 132 for a database table 122 based at least on the partitioning configuration 140 defined for the database table 122. The database manager 130 may replace the current partitioning definition 124 with the new partitioning definition 132, thus extending the current partitioning definition 124 of the database table 122. Once replaced, the new partitioning definition 132 becomes the current partitioning definition 124 for the database table, and data contained in the database table 122 is partitioned based on the updated current partitioning definition 124.

In an embodiment, partition configuration 140 may include a separate configuration for each of one or more database tables 122 having a current partitioning definition 124. Partition configuration 140 for each database table 122 may include a customized configuration for extending one or more current partitioning definitions 124 defined for the database table 122. Partition configuration 140 may include configuration for extending range-based as well as case-based partitioning. Additionally, partitioning configuration 140 may include configuration for extending single-level data partitioning as well as multi-level data partitioning. For example, when a current partitioning definition 124 for a database table 122 defines a range-based partitioning (single-level or multi-level), the partition configuration 140 may include new and/or extended ranges for one or more data types included in the current data partitioning definition 124. For example, when a current partitioning definition 124 of an employee database table 122 defines data partitioning based on the data type "employee joining year" with the maximum year range set to year 2021, the partition configuration 140 may include extended ranges for the employee joining year up to year 2030 such that employee data records associated with employees joining the organization after year 2021 are appropriately assigned data partitions. In an additional or alternative embodiment, the partition configuration 140 may include configuration to define a new partitioning definition 132 based on one or more ranges of one or more new data types not included in the current data partitioning definition 124 for the database table 122. For example, when a current partitioning definition 124 for the employee database table 122 defines data partitioning based on the data type "employee joining year" only, the partition configuration 140 may include configuration to define additional partitioning based on employee joining month as well. When the current partitioning definition 124 includes definition for multi-level range-based partitioning based on ranges of two or more data types, the partition configuration 140 may include new or extended ranges for one or more of the data types included in the current partitioning definition 124. With regard to case-based partitioning (single-level or multi-level), the partition configuration may include configuration to define new or updated case-based partitioning based on a new or updated logical condition that partitions data based on one or more data types. The newly defined case-based partitioning may be in addition to or in place of the currently defined case-based partitioning as defined the current partitioning definition 124. For example, partition configuration 140 for an employee database table 133 may include configuration to generate a new multi-level case-based partition definition defining data partitioning based on a logical combination of employee joining month and employee location.

As described in more detail below, database manager 130 may be configured to start an extension operation for extending data partitioning for a database table 122 in response to detecting a trigger event 134. One or more customized trigger events 134 may be configured for each database table 122, wherein each customized trigger event 134 triggers an extension operation for the database table 122. In one embodiment, a system administrator (e.g., one of the users 160) may define one or more trigger events 134 for each database table 122 based on the specific requirements for the database table 122. A trigger event 134 may include a time-based trigger event or a data-based trigger event. For example, a data-based trigger event 134 set for a database table 122 may include the database manager 130 detecting unpartitioned data in the database table 122. Data contained in a database table 122 may remain unpartitioned when a current data partitioning definition 124 does not assign a data partition to the data. Data contained in a database table 122 may remain unpartitioned when the data is out of the range as defined by a current range-based partitioning definition. Data contained in a database table 122 may also remain unpartitioned when a current case-based partitioning definition does not apply to the data. For example, a current data partitioning definition 124 for an employee database table 122 may define range-based data partitioning based on employee joining year till 2021. The current partitioning definition 124 may not define data partitions for data records associated with employee joining dates beyond 2021. Thus, data records having employee joining dates beyond 2021 are out of range and remain unpartitioned. In another example, a current partitioning definition 124 for the employee database table 122 may define a logical condition (e.g., case-based partitioning) that partitions employee data based on employee location only. For example, different data partitions are assigned to data records with employee location set to "USA", "Asia" and Europe. However, the company may open a new location in Australia and may start hiring new employees in Australia. In this case, all data records relating to employees at the new location are not covered by the current partitioning definition 124, and thus, remain unpartitioned. In one embodiment, when the data-based trigger event is set for a database table, a flag may be raised when new data record is added to a database table 122 that is not assigned a data partition. The database manager may perform an extension operation for the database table 122 in response to detecting the flag.

In an additional or alternative embodiment, a time-based trigger event 134 may include the database manager 130 detecting that a pre-configured periodic time interval is reached. A system administrator may set a periodic trigger event 134 for a database table 122. For example, the periodic trigger event 134 may include running the extension operation for the database table 122 periodically including, but not limited to, hourly, daily, weekly, monthly, yearly etc. The database manager may be configured to perform the extension operation for the database table 122 at the scheduled periodic time intervals.

In an additional or alternative embodiment, a time-based trigger event 134 may include the database manager 130 detecting that a pre-configured time is reached. The system administrator may set specific times (e.g., time schedule) to run the extension operation for a database table. For example, to avoid system down time during regular working hours, the system administrator may schedule the extension operation during weeknights, weekends or holidays. The database manager 130 may be configured to perform the extension operation for a database table 122 at particular times scheduled for the database table 122.

The extension operation mentioned above will now be discussed in more detail. Upon detecting a trigger event 134 set for a database table 122 as described above, the database manager 130 may be configured to initiate an extension operation for the database table 122. The database manager 130 may read the custom partition configuration 140 defined for the database table 122 and the current partitioning definition 124 of the database table 122 and determine how data partitioning is to be extended. For example, based on examining the partition configuration 140 and/or the current partitioning definition 124 for a database table 122, the database manager 130 may be configured to determine the nature of new partitioning definition 132 including, but not limited to, a single-level range-based partitioning definition, a multi-level range-based partitioning definition, a single-level case-based partitioning definition and a multi-level case based partitioning definition. In one embodiment, when the custom partition configuration 140 of the database table 122 includes ranges for one or more data types and the current partitioning definition 124 of the database table defines range-based partitioning based at least on the one or more data types, the database manager 130 may be configured to determine that a new range-based partitioning definition 132 is to be defined for the database table 122. The database manager 130 may further determine whether the range-based partitioning is single-level or multiple-level data partitioning based on whether the new partitioning definition 132 is for range-based partitioning based on a single datatype or multiple data types. In an additional or alternative embodiment, when the custom partition configuration 140 of the database table 122 includes a logical condition based on one or more data types of the database table 122, the database manager 130 may be configured to determine that a new case-based partitioning definition 132 is to be defined for the database table 122.

Database manager 130 may be configured to a invoke partitioning script 136 depending on the type of data partitioning to be defined by the new partitioning definition 132. A partitioning script 136 may be provided for each of single-level range-based partitioning, multi-level range-based partitioning and case-based partitioning. A partitioning script 136 may include a software code which may be run by the database manager 130 to generate a new partitioning definition 132 of the desired type. The database manager 130 may be configured to invoke and run a partitioning script 136 for a desired type of partitioning (e.g., single-level range-based partitioning, multi-level range-based partitioning and case-based partitioning) to generate a new partitioning definition 132 of the type.

For example, upon determining (e.g., based on partition configuration 140 and/or current partitioning definition 124) that a new multi-level range-based partitioning definition is to be defined for a database table 122, the database manager 130 may invoke the partitioning script 136 corresponding to multi-level range-based partitioning. The database manager 130 may pass the current partitioning definition 124 of the database table 122 and the range values of the data types as defined in the partition configuration 140, as input parameters to the partitioning script 136. The database manager 130 may run the partitioning script 136 after passing the input parameters. The partitioning script 136 may automatically generate a new partitioning definition 132 for the database table 122 by updating/adding the new ranges of the data types (from the partition configuration 140) in the current partitioning definition 124.

In another example, upon determining (e.g., based on partition configuration 140) that a new case-based partitioning definition is to be defined for a database table 122, the database manager 130 may invoke the partitioning script 136 corresponding to case-based partitioning. The database manager 130 may pass the logical condition as defined in the partition configuration 140, as an input parameter to the partitioning script 136. The database manager 130 may run the partitioning script 136 after passing the input parameter. The partitioning script 136 may automatically generate a new partitioning definition 132 for the database table 122 by defining the new logical condition (from the partition configuration 140).

Once a new partitioning definition 132 for a database table 122 is successfully generated, the database manager 130 may be configured to replace the current partitioning definition 124 of the database table 122 with the new data partitioning definition 132 such that the new data partitioning definition 132 becomes the current data partitioning definition 124 of the database table 122, thus extending or updating the current partition definition 124 of the database table 122. In one embodiment, once the current partitioning definition 124 is updated with the new partitioning definition 132, the database manager 130 may run data partition for the database table 122 based on the updated current partitioning definition so that all data contained in the database table is appropriately partitioned based on the updated current partitioning definition.

In one or more embodiments, upon detecting a trigger event 134, the database manager 130 may be configured to validate whether a current data partitioning definition 124 is to be extended or not before proceeding with further steps of the extension operation. For example, when the database manager 130 detects a flag indicating that unpartitioned data exists in a database table 122, the database manager 130 may examine at least one of the data contained in the database table 122, the current partitioning definition 124 of the database table 122 and the partition configuration 140 of the database table 122 to determine whether a new partitioning definition 132 is to be defined or not. In some cases, the flag may have been generated in error when there is actually no unpartitioned data in the database table 122. Upon determining that the current partitioning definition 124 of the database table 122 does not need extending/updating, the database manager 130 terminates the extension operation and ignores the trigger event 134. The database manager 130 proceeds further with the extension operation only upon successfully validating that the current partitioning definition 124 of the database table 122 needs extending/updating.

In one or more embodiments, the database manager 130 may be configured to update an audit log 138 to record one or more steps and outcomes/results thereof during an extension operation. For example, the database manager 130 may be configured to record whether a validation of the extension operation as described above was successful or not. In another example, the database manager 130 may be configured to record whether generation of a new partitioning definition was successful or not.

The database manager 130 may be configured to send out automated notifications to one or more users 160 (e.g., including the system administrator) to report outcomes of one or more steps during the extension operation. For example, the database manager 130 may send out a notification to report the outcome of the extension validation and/or to report whether a new partitioning definition 132 was successfully generated for a database table 122.

In one or more embodiment, the database manager 130 may be configured to service database queries received by the database system 110. As described above, database 120 may be queried using database queries (e.g., SQL query) to extract desired data stored in the database tables 122. Upon receiving a database query from a user device 150, the database manager 130 may search the database 120 (e.g., database tables 122) based on the database query, extract data from one or more database tables 122 based on the query parameters of the database query and transmit back the extracted data to the user device 150.

Figure 2:
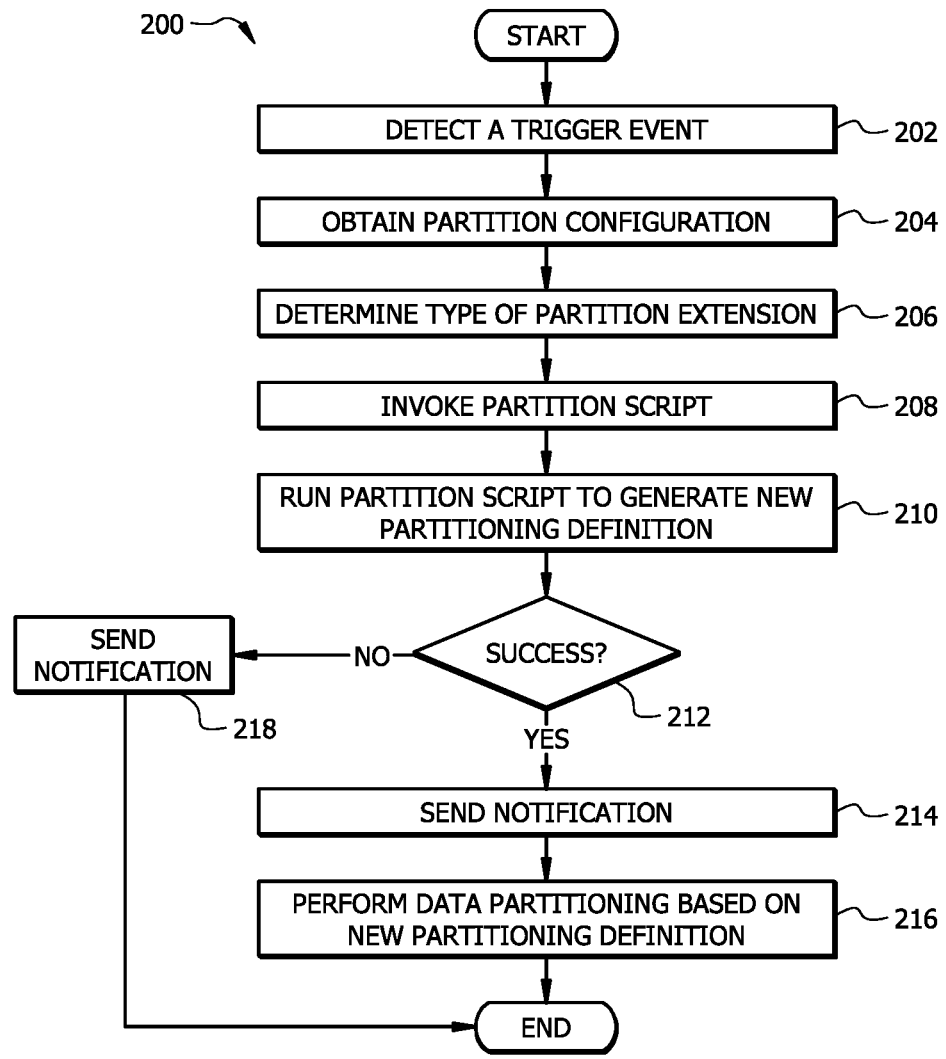
FIG. 2 is a flowchart of an example method for extending data partitioning for a database table, in accordance with one or more embodiments of the present disclosure.

FIG. 2 is a flowchart of an example method 200 for extending data partitioning for a database table, in accordance with one or more embodiments of the present disclosure. Method 200 may be performed by the database manager 130 as shown in FIG. 1 and described above.

At operation 202, database manager 130 detects a trigger event 134 relating to extending a current partitioning definition 124 for a particular database table 122.

As described above, database manager 130 may start an extension operation for extending data partitioning for a database table 122 in response to detecting a trigger event 134. One or more customized trigger events 134 may be configured for each database table 122, wherein each customized trigger event 134 triggers an extension operation for the database table 122. In one embodiment, a system administrator (e.g., one of the users 160) may define one or more trigger events 134 for each database table 122 based on the specific requirements for the database table 122. A trigger event 134 may include a time-based trigger event or a data-based trigger event. For example, a data-based trigger event 134 set for a database table 122 may include the database manager 130 detecting unpartitioned data in the database table 122. Data contained in a database table 122 may remain unpartitioned when a current data partitioning definition 124 does not assign a data partition to the data. Data contained in a database table 122 may remain unpartitioned when the data is out of the range as defined by a current range-based partitioning definition. Data contained in a database table 122 may also remain unpartitioned when a current case-based partitioning definition does not apply to the data. For example, a current data partitioning definition 124 for an employee database table 122 may define range-based data partitioning based on employee joining year till 2021. The current partitioning definition 124 may not define data partitions for data records associated with employee joining dates beyond 2021. Thus, data records having employee joining dates beyond 2021 are out of range and remain unpartitioned. In another example, a current partitioning definition 124 for the employee database table 122 may define a logical condition (e.g., case-based partitioning) that partitions employee data based on employee location only. For example, different data partitions are assigned to data records with employee location set to "USA", "Asia" and Europe. However, the company may open a new location in Australia and may start hiring new employees in Australia. In this case, all data records relating to employees at the new location are not covered by the current partitioning definition 124, and thus, remain unpartitioned. In one embodiment, when the data-based trigger event is set for a database table, a flag may be raised when new data record is added to a database table 122 that is not assigned a data partition. The database manager may perform an extension operation for the database table 122 in response to detecting the flag.

In an additional or alternative embodiment, a time-based trigger event 134 may include the database manager 130 detecting that a pre-configured periodic time interval is reached. A system administrator may set a periodic trigger event 134 for a database table 122. For example, the periodic trigger event 134 may include running the extension operation for the database table 122 periodically including, but not limited to, hourly, daily, weekly, monthly, yearly etc. The database manager may perform the extension operation for the database table 122 at the scheduled periodic time intervals.

In an additional or alternative embodiment, a time-based trigger event 134 may include the database manager 130 detecting that a pre-configured time is reached. The system administrator may set specific times (e.g., time schedule) to run the extension operation for a database table. For example, to avoid system down time during regular working hours, the system administrator may schedule the extension operation during weeknights, weekends or holidays. The database manager 130 may perform the extension operation for the database table 122 at particular times scheduled for the database table 122.

At operation 204, the database manager 130 obtains partitioning configuration 140 defined for the database table 122. In one embodiment, the database manager 130 may additionally obtain the current data partitioning definition 124 of the database table 122.

As described above, partition configuration 140 may include a separate configuration for each of one or more database tables 122 having a current partitioning definition 124. Partition configuration 140 for each database table 122 may include a customized configuration for extending one or more current partitioning definitions 124 defined for the database table 122. Partition configuration 140 may include configuration for extending range-based as well as case-based partitioning. Additionally, partitioning configuration 140 may include configuration for extending single-level data partitioning as well as multi-level data partitioning. For example, when a current partitioning definition 124 for a database table 122 defines a range-based partitioning (single-level or multi-level), the partition configuration 140 may include new and/or extended ranges for one or more data types included in the current data partitioning definition 124. For example, when a current partitioning definition 124 of an employee database table 122 defines data partitioning based on the data type "employee joining year" with the maximum year range set to year 2021, the partition configuration 140 may include extended ranges for the employee joining year up to year 2030 such that employee data records associated with employees joining the organization after year 2021 are appropriately assigned data partitions. In an additional or alternative embodiment, the partition configuration 140 may include configuration to define a new partitioning definition 132 based on one or more ranges of one or more new data types not included in the current data partitioning definition 124 for the database table 122. For example, when a current partitioning definition 124 for the employee database table 122 defines data partitioning based on the data type "employee joining year" only, the partition configuration 140 may include configuration to define additional partitioning based on employee joining month as well. When the current partitioning definition 124 includes definition for multi-level range-based partitioning based on ranges of two or more data types, the partition configuration 140 may include new or extended ranges for one or more of the data types included in the current partitioning definition 124. With regard to case-based partitioning (single-level or multi-level), the partition configuration 140 may include configuration to define new or updated case-based partitioning based on a new or updated logical condition that partitions data based on one or more data types. The newly defined case-based partitioning may be in addition to or in place of the currently defined case-based partitioning as defined the current partitioning definition 124. For example, partition configuration 140 for an employee database table 133 may include configuration to generate a new multi-level case-based partition definition defining data partitioning based on a logical combination of employee joining month and employee location.

At operation 206, the database manager 130 determines a type of database partitioning that is to be extended or defined. As described above, upon detecting a trigger event 134 set for a database table 122 as described above, the database manager 130 may be configured to initiate an extension operation for the database table 122. The database manager 130 may read the custom partition configuration 140 defined for the database table 122 and the current partitioning definition 124 of the database table 122 and determine how data partitioning is to be extended. For example, based on examining the partition configuration 140 and/or the current partitioning definition 124 for a database table 122, the database manager 130 may be configured to determine the nature of new partitioning definition 132 that is to be defined including, but not limited to, a single-level range-based partitioning definition, a multi-level range-based partitioning definition, a single-level case-based partitioning definition and a multi-level case based partitioning definition. In one embodiment, when the custom partition configuration 140 of the database table 122 includes ranges for one or more data types and the current partitioning definition 124 of the database table defines range-based partitioning based at least on the one or more data types, the database manager 130 may determine that a new range-based partitioning definition 132 is to be defined for the database table 122. The database manager 130 may further determine whether the range-based partitioning is single-level or multiple-level data partitioning based on whether the new partitioning definition 132 is for range-based partitioning based on a single datatype or multiple data types. In an additional or alternative embodiment, when the custom partition configuration 140 of the database table 122 includes a logical condition based on one or more data types of the database table 122, the database manager 130 may determine that a new case-based partitioning definition 132 is to be defined for the database table 122.

At operation 208, the database manager 130 invokes a partitioning script 136 designed to generate the new partitioning definition 132 for the determined type of data partitioning.

At operation 210, the database manager 130 processes partitioning script to generate the new partitioning definition 132.

As described above, database manager 130 may invoke partitioning script 136 depending on the type of data partitioning to be defined by the new partitioning definition 132. A partitioning script 136 may be provided for each of single-level range-based partitioning, multi-level range-based partitioning and case-based partitioning. A partitioning script 136 may include a software code which may be run by the database manager 130 to generate a new partitioning definition 132 of the desired type. The database manager 130 may invoke and run a partitioning script 136 for a desired type of partitioning (e.g., single-level range-based partitioning, multi-level range-based partitioning and case-based partitioning) to generate a new partitioning definition 132 of the type.

For example, upon determining (e.g., based on partition configuration 140 and/or current partitioning definition 124) that a new multi-level range-based partitioning definition is to be defined for a database table 122, the database manager 130 may invoke the partitioning script 136 corresponding to multi-level range-based partitioning. The database manager 130 may pass the current partitioning definition 124 of the database table 122 and the range values of the data types as defined in the partition configuration 140, as input parameters to the partitioning script 136. The database manager 130 may run the partitioning script 136 after passing the input parameters. The partitioning script 136 may automatically generate a new partitioning definition 132 for the database table 122 by updating/adding the new ranges of the data types (from the partition configuration 140) in the current partitioning definition 124.

In another example, upon determining (e.g., based on partition configuration 140) that a new case-based partitioning definition is to be defined for a database table 122, the database manager 130 may invoke the partitioning script 136 corresponding to case-based partitioning. The database manager 130 may pass the logical condition as defined in the partition configuration 140, as an input parameter to the partitioning script 136. The database manager 130 may run the partitioning script 136 after passing the input parameter. The partitioning script 136 may automatically generate a new partitioning definition 132 for the database table 122 by defining the new logical condition (from the partition configuration 140).

At operation 212, database manager 130 checks whether the generation of new partitioning definition 132 was successful. If the generation failed, data manager 130 sends out a failure notification at operation 218 to pre-configured parties (e.g., system administrator, other users 160 etc.). On the other hand, when the generation of the new partitioning definition 132 is successful database manager 130 sends a notification at operation 214 to the concerned parties that a new partition definition 132 was successfully generated for the database table 122.

At operation 216, database manager 130 partitions data contained in the database table 122 based on the new partitioning definition 132. As described above, once a new partitioning definition 132 for a database table 122 is successfully generated, the database manager 130 may replace the current partitioning definition 124 of the database table 122 with the new data partitioning definition 132 such that the new data partitioning definition 132 becomes the current data partitioning definition 124 of the database table 122, thus extending or updating the current partition definition 124 of the database table 122. In one embodiment, once the current partitioning definition 124 is updated with the new partitioning definition 132, the database manager 130 may run data partition for the database table 122 based on the updated current partitioning definition so that all data contained in the database table is appropriately partitioned based on the updated current partitioning definition.

Figure 3:
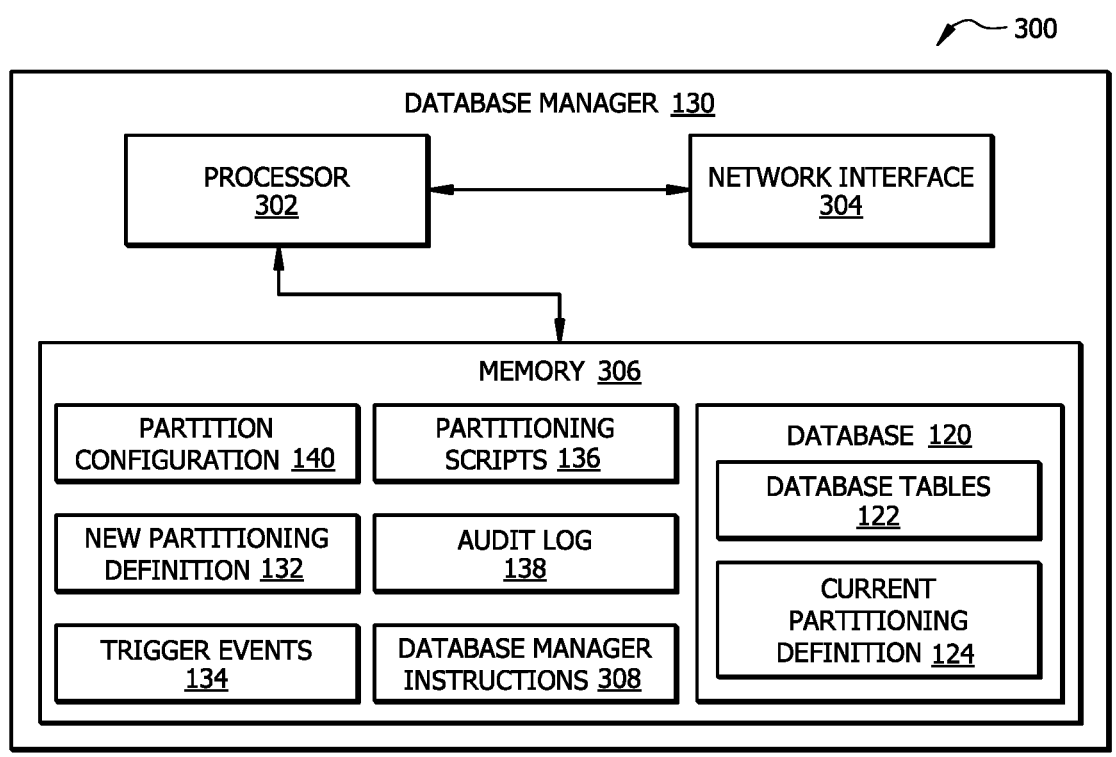
FIG. 3 illustrates an example schematic diagram of the database manager illustrated in FIG. 1, in accordance with one or more embodiments of the present disclosure.

FIG. 3 illustrates an example schematic diagram 300 of the database manager 130 illustrated in FIG. 1, in accordance with one or more embodiments of the present disclosure.

Database manager 130 includes a processor 302, a memory 306, and a network interface 304. The database manager 130 may be configured as shown in FIG. 4 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., database manager instructions 308) to implement the database manager 130. In this way, processor 302 may be a special-purpose computer designed to implement the functions disclosed herein. In one or more embodiments, the database manager 130 is implemented using logic units, FPGAs, ASICs, DSPs, or any other suitable hardware. The database manager 130 is configured to operate as described with reference to FIGS. 1-2. For example, the processor 302 may be configured to perform at least a portion of the method 200 as described in FIG. 2.

The memory 306 comprises one or more disks, tape drives, or solid-state drives, and may be used as an over-flow data storage device, to store programs when such programs are selected for execution, and to store instructions and data that are read during program execution. The memory 306 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the database 120 including the database tables 122 and the current partitioning definition 124, partition configuration 140, new partitioning definition 132, trigger events 134, partitioning scripts 136 audit log 138 and the database manager instructions 308. The database manager instructions 308 may include any suitable set of instructions, logic, rules, or code operable to execute the database manager 130.

The network interface 304 is configured to enable wired and/or wireless communications. The network interface 304 is configured to communicate data between the database manager 130 and other devices, systems, or domains (e.g. user devices 150). For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that each of the database system 110 and user devices 150 may be implemented similar to the database manager 130. For example, the database system 110 and each user device 150 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a database that stores a database table; and at least one processor configured to:
  detect a trigger event that triggers the extending of a current data partitioning definition defined for partitioning data stored in the database table, wherein:
    the extending comprises replacing the current data partitioning definition with a new data partitioning definition;
    the trigger event triggers the generation of the new data partitioning definition; and
    detecting the trigger event comprises detecting that a new piece of data added to the database table is not assigned a data partition based on the current data partitioning definition;
  obtain a partition configuration to generate the new data partitioning definition,
  wherein the partition configuration comprises one or more of:
    a configuration for a range-based partitioning including a new range for at least one datatype of the database table, wherein the at least one datatype is included in the current partitioning definition for the database table; and
    a configuration for a case-based partitioning including a new logical condition for partitioning the data in the database table based on one or more data types of the database table;
  obtain the current data partitioning definition of the database table;
  generate the new data partitioning definition for the database table based on the current data partitioning definition and the partition configuration; and
  perform data partitioning for the database table based on the new data partitioning definition, wherein the new data partitioning definition assigns a data partition to the new piece of data from the database table.

2. The system of claim 1, wherein the at least one processor generates the new data partitioning definition for the database table by:
  when the current data partitioning definition is for the range-based partitioning, defining the new range for the at least one data type in the current data partitioning definition for the database table; and
  when the current partitioning definition is for the case-based partitioning, defining the new logical condition for partitioning the data in the database table based on the one or more data types of the database table.

3. The system of claim 1, wherein the range-based partitioning includes one or more of a single-level range-based partitioning based on a single data type of the database table and a multi-level range-based partitioning based on a combination of multiple data types of the database table.

4. The system of claim 3, wherein the at least one processor is further configured to:
  determine a type of data partitioning that is to be extended comprising one or more of the single-level range-based partitioning, the multi-level range-based partitioning and the case-based partitioning;
  invoke a script designed to generate the new partitioning definition for the determined type of data partitioning; and
  process the script to generate the new data partitioning definition.

5. The system of claim 1, wherein the at least one processor is further configured to:
  after detecting the trigger event, detect that a data partition of the database table is empty; and
  in response, delete the data partition that is empty.

6. The system of claim 1, wherein the trigger event comprises one or more of:
  detecting that a pre-configured periodic time interval is reached; and
  detecting that a pre-configured time is reached.

7. The system of claim 6, wherein the at least one processor is further configured to:
  in response to detecting new data added to the database table that is not assigned a data partition, validate the trigger event to confirm whether the new data was added to the database table and was not assigned a data partition; and
  generate the new partitioning definition after the validation is successful.

8. The system of claim 1, wherein each data type corresponds to a single column of the database table.

9. A method for partitioning a database table, comprising:
  detecting a trigger event that triggers extending of a current data partitioning definition defined for partitioning data stored in the database table, wherein:
    the extending comprises replacing the current data partitioning definition with a new data partitioning definition;
    the trigger event triggers the generation of the new data partitioning definition; and
    detecting the trigger event comprises detecting that a new piece of data added to the database table is not assigned a data partition based on the current data partitioning definition;
  obtaining a partition configuration to generate the new data partitioning definition,
  wherein the partition configuration comprises one or more of:
    a configuration for a range-based partitioning including a new range for at least one datatype of the database table, wherein the at least one datatype is included in the current partitioning definition for the database table; and
    a configuration for a case-based partitioning including a new logical condition for partitioning the data in the database table based on one or more data types of the database table;
  obtaining the current data partitioning definition of the database table;
  generating the new data partitioning definition for the database table based on the current data partitioning definition and the partition configuration; and
  performing data partitioning for the database table based on the new data partitioning definition, wherein the new data partitioning definition assigns a data partition to the new piece of data from the database table.

10. The method of claim 9, wherein generating the new data partitioning definition for the database table comprises:
  when the current data partitioning definition is for the range-based partitioning, defining the new range for the at least one data type in the current data partitioning definition for the database table; and
  when the current partitioning definition is for the case-based partitioning, defining the new logical condition for partitioning the data in the database table based on the one or more data types of the database table.

11. The method of claim 9, further comprising:
  determining a type of data partitioning that is to be extended comprising one or more of a single-level range-based partitioning, a multi-level range-based partitioning and a case-based partitioning;

invoking a script designed to generate the new partitioning definition for the determined type of data partitioning; and processing the script to generate the new data partitioning definition.

12. The method of claim 9, further comprising:

after detecting the trigger event, detecting that a data partition of the database table is empty; and in response, deleting the data partition that is empty.

13. The method of claim 9, wherein the trigger event comprises one or more of:

detecting that a pre-configured periodic time interval is reached; and detecting that a pre-configured time is reached.

14. The method of claim 13, further comprising:

in response to detecting new data added to the database table that is not assigned a data partition, validating the trigger event to confirm whether the new data was added to the database table and was not assigned a data partition; and generating the new partitioning definition after the validation is successful.

15. The method of claim 9, wherein each data type corresponds to a single column of the database table.

16. A non-transitory computer-readable medium storing instructions that when executed by a processor cause the processor to:

detect a trigger event that triggers extending a current data partitioning definition defined for partitioning data stored in the database table, wherein:

the extending comprises replacing the current data partitioning definition with a new data partitioning definition;

the trigger event triggers the generation of the new data partitioning definition; and detecting the trigger event comprises detecting that a new piece of data added to the database table is not assigned a data partition based on the current data partitioning definition;

obtain a partition configuration to generate the new data partitioning definition, wherein the partition configuration comprises one or more of:

a configuration for a range-based partitioning including a new range for at least one datatype of the database table, wherein the at least one datatype is included in the current partitioning definition for the database table; and a configuration for a case-based partitioning including a new logical condition for partitioning the data in the database table based on one or more data types of the database table;

obtain the current data partitioning definition of the database table;

generate the new data partitioning definition for the database table based on the current data partitioning definition and the partition configuration; and perform data partitioning for the database table based on the new data partitioning definition, wherein the new data partitioning definition assigns a data partition to the new piece of data from the database table.

17. The non-transitory computer-readable medium of claim 16, wherein generating the new data partitioning definition for the database table comprises:

when the current data partitioning definition is for the range-based partitioning, defining the new range for the at least one data type in the current data partitioning definition for the database table; and when the current partitioning definition is for the case-based partitioning, defining the new logical condition for partitioning the data in the database table based on the one or more data types of the database table.

18. The non-transitory computer-readable medium of claim 16, wherein the instructions further cause the processor to:

determine a type of data partitioning that is to be extended comprising one or more of a single-level range-based partitioning, a multi-level range-based partitioning and a case-based partitioning;

invoke a script designed to generate the new partitioning definition for the determined type of data partitioning; and process the script to generate the new data partitioning definition.

19. The non-transitory computer-readable medium of claim 16, wherein the instructions further cause the processor to:

after detecting the trigger event, detect that a data partition of the database table is empty; and in response, delete the data partition that is empty.

20. The non-transitory computer-readable medium of claim 16, wherein detecting the trigger event comprises one or more of:

detecting new data added to the database table and not assigned a data partition based on the current data partitioning definition;

detecting that a pre-configured periodic time interval is reached; and detecting that a pre-configured time is reached.

* * * * *